United States Patent [19]
Nelson

[11] Patent Number: 5,613,371
[45] Date of Patent: Mar. 25, 1997

[54] METHOD AND APPARATUS FOR MISTING VEHICLE OCCUPANTS

[76] Inventor: Kim L. Nelson, 3152 E. Jerome, Mesa, Ariz. 85204

[21] Appl. No.: 418,821
[22] Filed: Apr. 7, 1995
[51] Int. Cl.$^6$ .................................................. E60H 1/32
[52] U.S. Cl. ................................ 62/244; 62/91; 62/239; 62/259.4
[58] Field of Search .................... 62/64, 91, 239, 62/244, 259.4

[56] References Cited

U.S. PATENT DOCUMENTS

| 2,114,558 | 4/1938 | Dismukes | 20/40.5 |
|---|---|---|---|
| 2,665,171 | 1/1954 | Stievater | 299/104 |
| 2,727,366 | 12/1955 | Hagen | 62/139 |
| 3,583,174 | 6/1971 | Logue | 62/309 |
| 3,738,621 | 6/1973 | Anderson | 261/29 |
| 4,360,368 | 11/1982 | Lyon | 55/259 |
| 4,658,597 | 4/1987 | Shum | 62/236 X |
| 4,708,088 | 11/1987 | Purvis et al. | 239/89 X |
| 4,807,813 | 2/1989 | Coleman | 239/153 |
| 5,005,367 | 4/1991 | Hwang | 62/244 X |
| 5,046,449 | 9/1991 | Nelson | 118/315 |
| 5,112,535 | 5/1992 | Roberson | 261/27 |
| 5,285,654 | 2/1994 | Ferdows | 62/309 |
| 5,337,960 | 8/1994 | Allen | 239/280.5 |
| 5,373,703 | 12/1994 | Pal | 62/239 X |

FOREIGN PATENT DOCUMENTS

| 2653073 | 4/1991 | France | 62/244 |
|---|---|---|---|
| 2669407 | 5/1992 | France | 62/259.4 |
| 266016 | 10/1989 | Japan | 62/259.4 |
| 4-201618 | 7/1992 | Japan | 62/244 |

Primary Examiner—Christopher Kilner
Attorney, Agent, or Firm—Parsons & Goltry; Robert A. Parsons; Michael W. Goltry

[57] ABSTRACT

A method and apparatus for misting vehicle occupants. A golf cart or other open-air vehicle is equipped with an apparatus for providing a fine spray of water into the air inside and surrounding the vehicle, resulting in evaporative cooling for the occupants. A pumping system forces water from a water reservoir on-board the vehicle through mister nozzles. The pumping system uses a water filter, pump, and accumulator to achieve a steady spray. In the preferred embodiment, a pressure switch in the golf cart seat turns on the spray when an occupant is sitting in the cart, and stops misting when the occupant is not seated. Alternatively, the misters may be switched to spray continuously or turned off.

12 Claims, 4 Drawing Sheets

METHOD AND APPARATUS FOR MISTING VEHICLE OCCUPANTS

BACKGROUND OF THE INVENTION

This invention relates generally to a fluid-spraying method and device for vehicles, and more particularly, in the preferred embodiment, to a water misting method and apparatus for golf carts.

Dry, hot climates are ideal for outdoor activity, which lends itself to open-air vehicles such as golf carts, "Jeeps" and other convertible sport utility vehicles, dune buggies, motorcycles, and boats. Similarly, tractors and other agricultural vehicles commonly have open-air occupant compartments. It may be uncomfortable to ride in these vehicles during the hottest parts of the year, however, because the heat in the ambient air becomes intolerable. It is desirable then, to have a way of cooling the occupants of open-air vehicles.

Evaporative cooling systems for vehicles are known in the art. For example, U.S. Pat. Nos. 5,112,535; 5,285,654; 4,360,368; 3,738,621; and 3,583,174 disclose variations on systems in which air cooled by evaporation is blown into the occupant compartment of the vehicle. These systems are based on a general concept of a pump spraying water onto a pad or filter, saturating it. A fan draws hot air through the pad and blows the resulting cooled air into the vehicle. Typically, these relatively large apparatuses are mounted to the roof of vehicles.

Another method of evaporative cooling involves spraying a fine mist of water into the ambient air. The mist not only cools the air but, when settling on skin, cools the body through direct evaporation. Mister nozzles are well known in the southwestern Unites States and are commonly used for cooling large areas of property, such as patios and spectator stands at ballparks. Due to the need for a significantly large water source and pumping system, the misting apparatus is stationary. One known portable system using the mister nozzles is sold by "MISTY MATE." This device is a pump sprayer, much like a garden sprayer, with a mist nozzle attached at the end of the spray wand. The container is pressurized by hand-pumping air into a cannister that has been partially filled with water. A misting system for cooling vehicles is desired.

It is an object of this invention to provide an evaporative cooling system to cool the occupants of open-air vehicles. It is a further object of this invention to provide an inconspicuous, self-contained misting system for open-air vehicles. It is a further object of this invention to provide a misting system for a golf cart that can mist the occupants for as long as it takes to play a round of golf. It is another object of this invention to provide a vehicle misting system that provides a steady flow of mist and does not drip on the occupants of the vehicle.

BRIEF SUMMARY OF THE INVENTION

A golf cart or other open-air vehicle is equipped with an apparatus for providing a fine spray of water into the air inside and surrounding the vehicle, resulting in evaporative cooling for the occupants. A pumping system forces water from a water reservoir on-board the vehicle through mister nozzles. The pumping system uses a water filter, pump, and accumulator to achieve a steady spray. In the preferred embodiment, a pressure switch in the golf cart seat turns on the spray when an occupant is sitting in the cart, and stops misting when the occupant is not seated. Alternatively, the misters may be switched to spray continuously or turned off.

DESCRIPTION OF THE PREFERRED EMBODIMENTS

Figure 1:
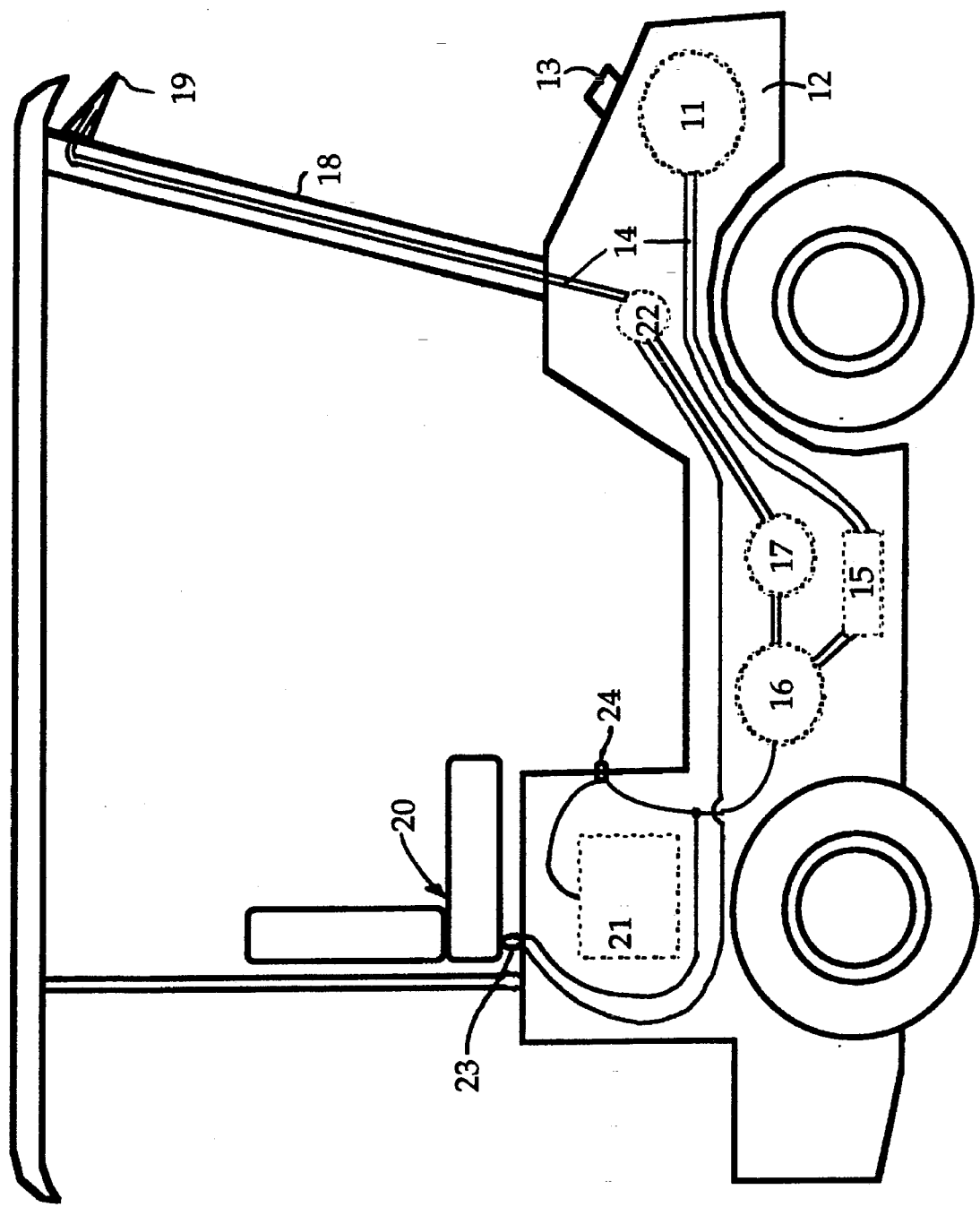
FIG. 1 shows a side view of the present invention embodied in a golf cart.
Figure 2:
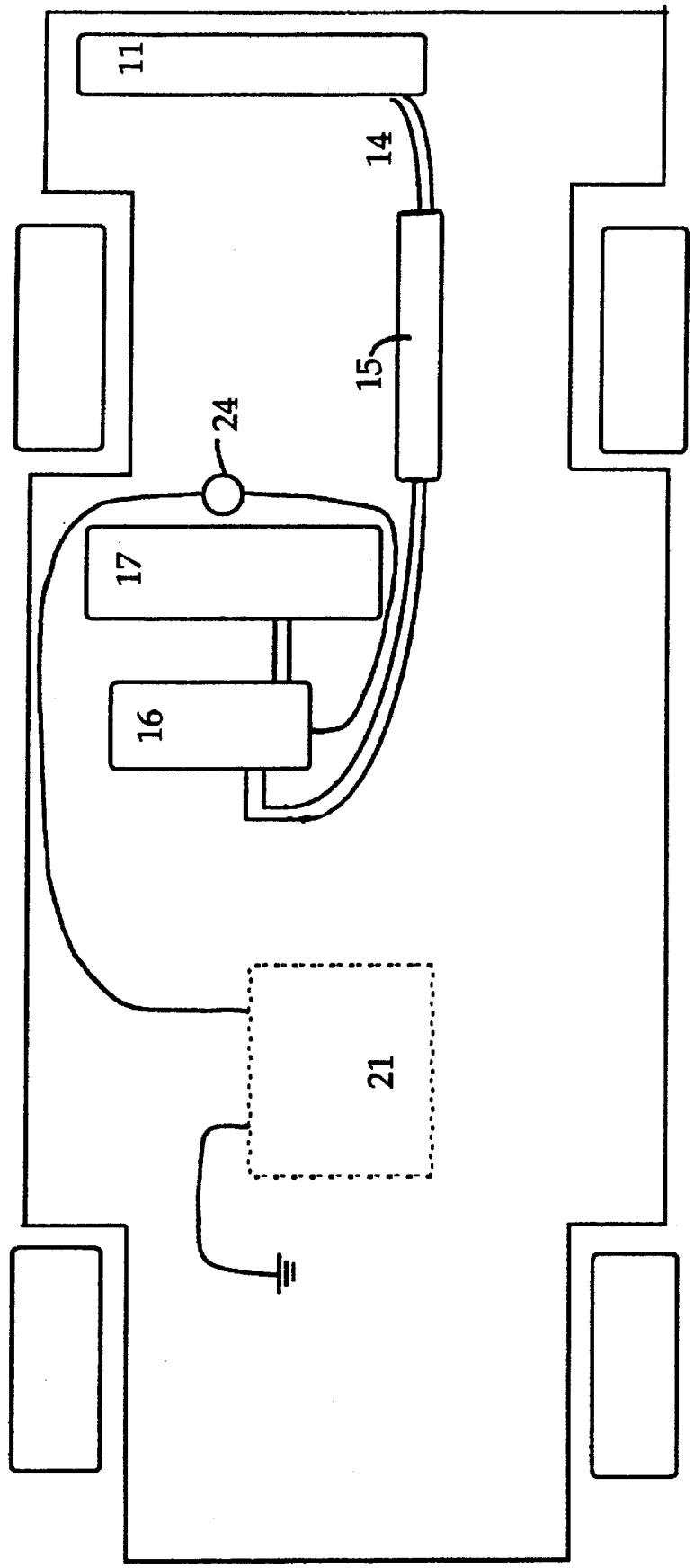
FIG. 2 show a bottom view of the golf cart of FIG. 1.
Figure 3:
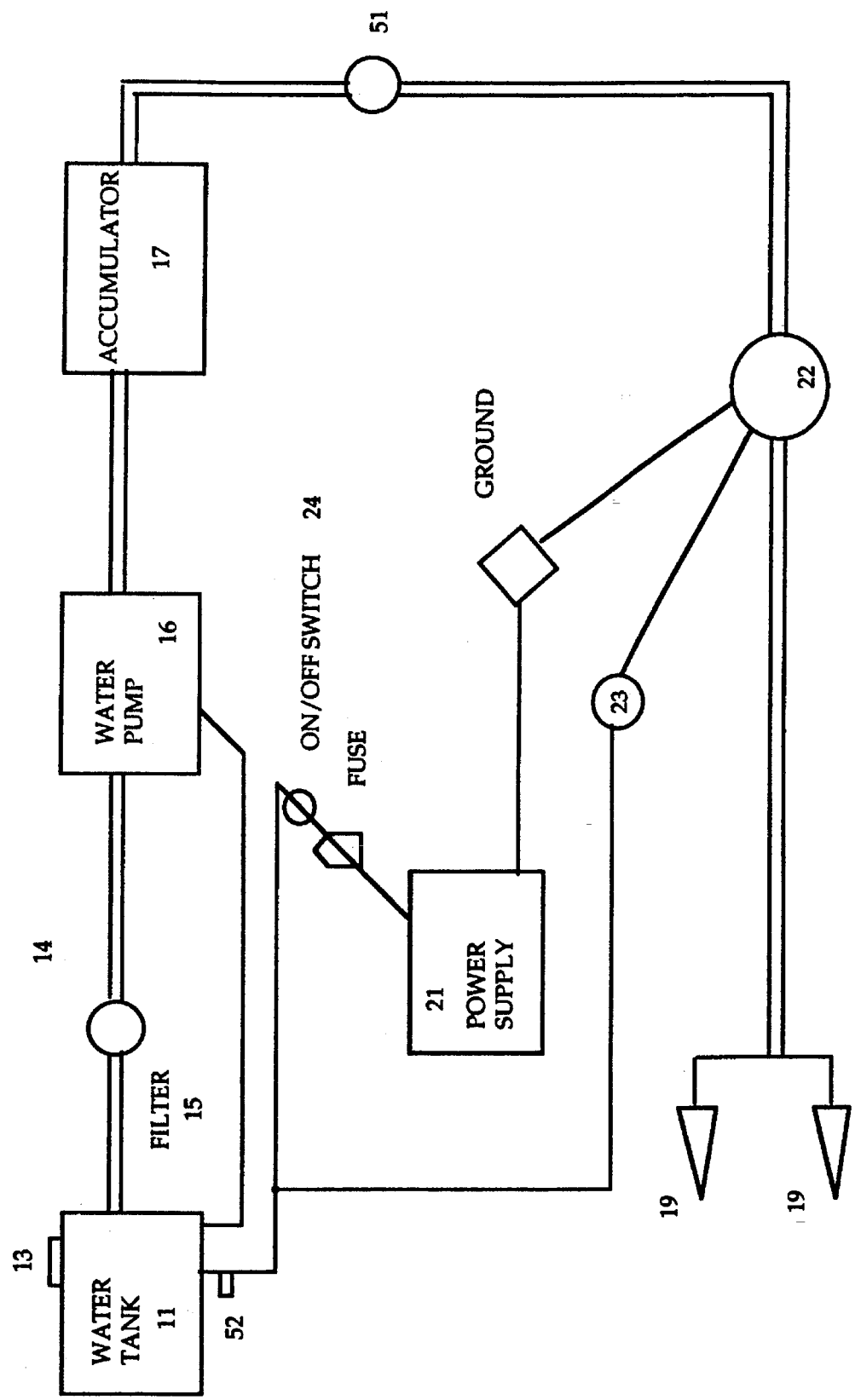
FIG. 3 is a schematic illustration of the first embodiment of the present invention embodied in a golf cart.

Please refer to the accompanying FIGS. 1–3 where like numerals refer to like parts throughout the drawings. It is desirable to provide a misting system that is relatively inconspicuous, for simple aesthetic value, among other reasons. The components of the present invention, therefore, are disposed in substantially hidden position. The invention will provide the same misting capability, however, if the components are disposed in visible locations.

FIG. 1 is a side view of a golf cart embodying the preferred embodiment of the present invention. A water reservoir 11 holds the water that will be sprayed out as mist. The volume of the water reservoir is limited only by the size of the reservoir that may be carried by the vehicle. For a golf cart, it is found that a cylindrical tank holding approximately 2–5 gallons will fit under the nose of the golf cart's body 12. The reservoir may be filled through a fill hole 13 which corresponds to an aperture in the reservoir. The reservoir may also be removable so that it may be filled at a remote location or interchanged with a reservoir of different volume. The reservoir is preferably made of a lightweight, rust-proof material, such as plastic, but reservoirs of metal or other materials may also be used. Disposable bags of water may be used, thereby permitting convenient refills at remote locations.

The reservoir 11 is in fluid connection to a replaceable water filter 15. Flexible plastic tubing 14 is preferable, although metal or other materials may be used. Using filtered water is beneficial because it prevents the mist from acquiring an odor and it eliminates precipitates and mineral deposits that may clog the system. The filter is preferably a carbon filter, although ultraviolet purifiers may be used if sterilization is desired.

The filter 15 is connected to the pump 16 with tubing 14. For golf carts, the pump is preferably a 45 psi pump. The pump 16 delivers water at pressure to the accumulator 17. The accumulator 17 is a vessel in which air is trapped and compressed by the water, thus storing energy to supply water under pressure when the demand of the system is greater than the pump can momentarily supply. This results in a steady flow of mist, instead of a mist flow pulsing with the cycle of the pump. The accumulator 17 stores water at approximately the working pressure of the system, so that a supply of water is always immediately available to the system. The reserve of pressurized water thus allows the system to provide mist almost instantaneously upon turning the system on. Water is delivered from the accumulator 17 through tubing to the mister heads or nozzles 19 in a steady flow.

In a golf cart, the tubing 14 can be fed through the frame 18 supporting the roof so as to be hidden from view. The tubing terminates at mister heads 19 which disperse fine droplets of water that provide the evaporative cooling. The nozzles are typically made of brass and produce a highly-atomized cone-shape dispersal pattern. Mister nozzles are known in the art and can be purchased commercially in varying flow rates. The optimum flow rate for each use depends on the temperature of the ambient air and the length of time misting is desired. Half-gallon per hour mister nozzles in combination with a 4 gallon water reservoir will provide enough misting for an average round of golf in the desert sun.

The mister nozzles should be placed such that they disperse water on the occupants of the vehicle. Therefore, the mister nozzles may be positioned to directly spray the occupants sitting in the car. Or, the nozzles may be directed forward, away from the passenger compartment, so that as the vehicle drives forward it moves into the mist. Preferably, the nozzles are seated in positionable mounts that allow the nozzles to be repositioned at any time. An elegant mount used for golf carts is the "LOC LINE" fitting, which is a hollow, bendable plastic tube that stays put at the angle it's bent. On the golf cart, the tubing is fed through the frame, exiting near the roof, further fed through "LOC LINE" fittings, and finally terminating at the end of the mount. A mister nozzle fits at the end of the tube. Preferably the mister nozzles are removable so that they may be cleaned or replaced as necessary.

The apparatus is powered by an on-board power supply 21, preferably a 12 volt vehicle battery, although other size batteries may be used. The power supply is grounded to the frame of the vehicle. As shown in FIGS. 2 and 3, the power to the pump 16 is controlled with a power switch 24 that is connected to the power supply 21. A solenoid valve 22 is connected by tubing between the accumulator 17 and the nozzles 19. A pressure switch in the seat senses when an occupant is seated in the vehicle. This seat switch 23 (shown in FIG. 1) is connected between the power switch 24 and the solenoid valve 22. When power switch 24 is set to "off," the pump 16 is not powered and the misters 19 do not spray. When the power switch 24 is set to "on," the pump 16 is powered and the water is pressurized in the accumulator 17. When the power switch 24 is set to "on" and the seat switch 23 is switched, power is sent from the power supply 21 to the solenoid valve 22 which causes the solenoid valve 22 to open. Thus, the misters start spraying as soon as the seat switch 23 is triggered, i.e. as soon as an occupant sits in the seat. When the occupant gets off the seat, the seat switch 23 turns off, the solenoid valve 22 closes, and the misters 19 stop spraying.

Optionally, as shown in FIG. 3, a low-water sensor and shut-off switch 52 may be incorporated into the apparatus at the water reservoir. The low-water shut-off switch 52 is connected between the power switch 24 and the pump 16. While pumps typically have safety devices to prevent dry pumping, the low water switch 52 can be an added safety feature to prevent damage to the system. Another filter 51 may optionally be installed between the accumulator 17 and the mist nozzles 19. Furthermore, the power switch 24 may be tied into the vehicle's ignition such that the pump 16 is activated when the vehicle is started. Optionally if a seat switch 23 cannot be installed conveniently in a vehicle, a foot switch or other device to detect the presence of an occupant in the vehicle can be used to switch the solenoid valve 22.

Figure 4:
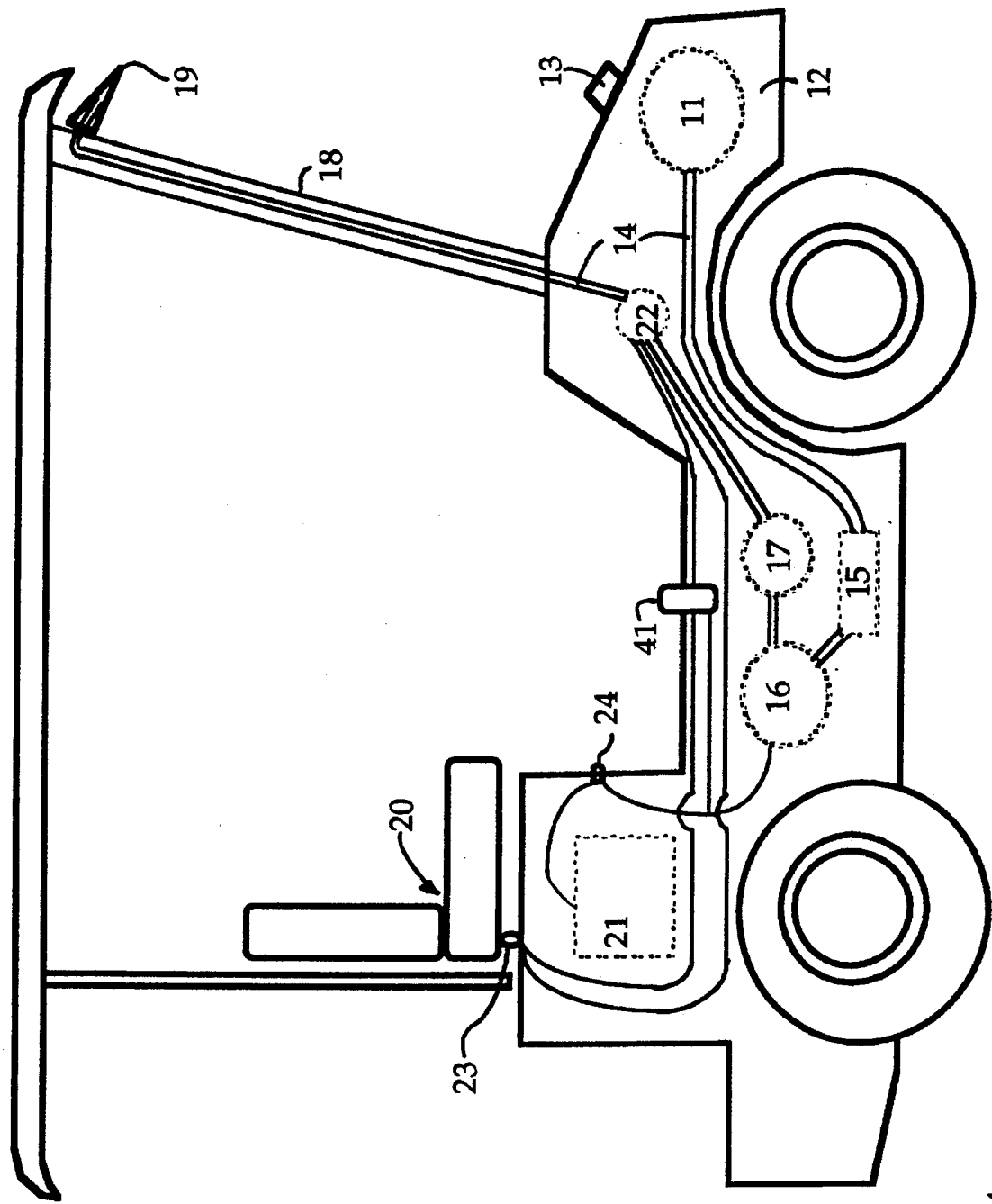
FIG. 4 is a schematic illustration of an alternative embodiment of the present invention embodied in a golf cart.

In an alternative embodiment, as shown in FIG. 4, a selector switch 41 is added to allow continuous misting or misting only when the vehicle is occupied. The selector switch 41 is connected between the power switch 24 and both the solenoid valve 24 and the seat switch 23. When the selector switch 41 is in the continuous misting position, the solenoid valve 22 is open whenever the power switch 24 is on. When the selector switch is in the switched misting position, the solenoid valve 22 is open only when both the power switch 24 is on and the seat switch 23 is on, i.e. the vehicle is occupied.

The method of evaporatively cooling vehicle occupants with a steady flow of mist is straightforward. The water reservoir is filled with an adequate amount of water for the duration of misting required. The reservoir is mounted on the vehicle and attached to the pumping apparatus, consisting of the water filter, pump, and accumulator to provide a steady flow. The system is powered by a battery on-board the vehicle, and is turned on with a power switch, as described above. If the power switch is on, the pump is activated, draws water from the water reservoir and, forces water into the accumulator until a desired pressure is attained within the accumulator. If an occupant sits in the vehicle's seat, the seat switch turns on and the solenoid valve opens to release the pressurized water in the accumulator through tubing to the misters. If an occupant leaves the vehicle's seat, the seat switch turns off and the solenoid valve closes, stopping the water mist spray from the misters.

The objects of this invention are achieved through the aforementioned embodiments. Although certain preferred embodiments have been shown and described, it should be understood that other embodiments and modifications that achieve these objects may be apparent to those of skill in the art and are within the scope of the appended claims.

I claim:

1. A vehicle misting apparatus for a vehicle having a power supply comprising:
   a) a water reservoir aboard the vehicle;
   b) a pump powered by the power supply, the pump in fluid communication with the water reservoir; and
   c) an accumulator connected in fluid communication between the pump;
   d) and at least one mist nozzle, wherein the nozzle sprays a mist of water with sufficient force to disperse water onto occupants of the vehicle without additional means of convection.

2. A vehicle misting apparatus according to claim 1 further comprising:
   a) a water filter connected in fluid communication between the water reservoir and a mist nozzle;
   b) a solenoid valve connected in fluid communication between the accumulator and the nozzle,;
   c) a power switch connected between the power supply and the pump;
   d) a seat switch cooperating with a seat of the vehicle and connected between the power switch and the solenoid valve such that the solenoid valve is open when an occupant sits in the seat and is closed when the seat is unoccupied.

3. An apparatus according to claim 2 further comprising a low-water shut-off in the water reservoir connected between the power switch and the pump.

4. A vehicle misting apparatus for a vehicle having a power supply comprising:
   a) a water reservoir aboard the vehicle;
   b) a pump assembly for conveying water from the water reservoir through tubing to at least one mist nozzle, wherein the pump assembly further comprises:

i) a water filter connected by tubing between the water reservoir and a pump;

ii) the pump connected by tubing between the water filter and an accumulator, the pump powered by the power supply;

iii) the accumulator connected by tubing between the pump and a solenoid valve; and iv) the solenoid valve connected by tubing between the accumulator and at least one mist nozzle, the solenoid valve connected to the power supply;

c) a power switch connected between the power supply and the pump, the power switch also connected between the power supply and the solenoid valve;

d) a seat switch cooperating with a seat of the vehicle and connected between the power switch and the solenoid valve such that the solenoid valve is open when an occupant sits in the seat and is closed when the seat is unoccupied;

wherein the water reservoir, pump assembly and tubing are disposed under the body of the vehicle such that they are substantially hidden from view.

5. An apparatus according to claim 4 wherein the vehicle is a golf cart.

6. An apparatus according to claim 4 wherein the water reservoir is removable.

7. An apparatus according to claim 4 wherein the water reservoir may be filled from the outside of the body of the vehicle through an aperture in the body that coincides with a fill hole in the water reservoir.

8. An apparatus according to claim 4 wherein the vehicle is a golf cart and the tubing connecting the accumulator to the nozzles is hidden within a roof-supporting frame of the golf cart.

9. An apparatus according to claim 4 wherein the power switch is the vehicles ignition switch.

10. An apparatus according to claim 4 further comprising a selector switch connected between the power switch and the seat switch and the solenoid valve, the selector switch connecting the power switch to the solenoid valve when in a continuous misting position and connecting the power switch to the seat switch when in a switched misting position.

11. A method for evaporatively cooling occupants of a vehicle having a power supply comprising the steps of:

a) retaining water in a water reservoir aboard the vehicle;

b) pumping the water at a substantially steady pressure through mist nozzles, the pumping further comprising the steps of i) powering the pumping system with electricity supplied by the power supply;

ii) drawing water through a filter into a pump;

iii) pumping water from the pump to an accumulator;

iv) releasing water from the accumulator;

v) conveying the released water through tubing to mist nozzles having sufficient force to disperse water onto occupants of the vehicle without additional means of convection.

12. A method according to claim 11 further comprising the steps of:

a) providing a power switch that switches the power between the power supply and the pump;

b) providing a seat switch and cooperating with a seat of the vehicle such that a solenoid valve connected by tubing between the accumulator and the mist nozzles opens when an occupant sits in the seat.

\* \* \* \* \*